US005548455A

United States Patent [19]
Sato

[11] Patent Number: 5,548,455
[45] Date of Patent: Aug. 20, 1996

[54] MOTOR CONTROL APPARATUS USING SPEED AND PHASE CONTROL IN A FIRST LOOP AND PHASE CONTROL IN A SECOND LOOP SERIES WITH THE FIRST LOOP

[75] Inventor: Tsuguo Sato, Kanagawa, Japan

[73] Assignee: Sony Corporation, Japan

[21] Appl. No.: 225,983

[22] Filed: Apr. 12, 1994

[30] Foreign Application Priority Data

Apr. 16, 1993 [JP] Japan .................... 5-112436

[51] Int. Cl.$^6$ ............................. G11B 15/52; G05B 1/02
[52] U.S. Cl. .................... 360/73.11; 360/73.04; 318/606
[58] Field of Search ............................ 360/10.3, 73.04, 360/73.09, 73.11–73.14; 318/606–608, 798, 799, 807–810

[56] References Cited

U.S. PATENT DOCUMENTS

| | | | |
|---|---|---|---|
| 4,409,628 | 10/1983 | Frimet et al. | 360/73.12 |
| 4,494,154 | 1/1985 | Akiyama | 369/44.29 |
| 4,510,535 | 4/1985 | Tokumitsu | 360/73.11 |
| 4,568,986 | 2/1986 | Furuhata et al. | 360/73.11 |
| 5,144,210 | 9/1992 | Sato | 360/10.2 |
| 5,204,601 | 4/1993 | Hirata et al. | 318/608 |
| 5,304,907 | 4/1994 | Abe et al. | 318/799 |
| 5,459,622 | 10/1995 | Tajima et al. | 360/10.3 |

OTHER PUBLICATIONS

Azuma et al., Microprocessor controlled variable play–back speed system for video tape recorder, Jan. 28, 1980, pp. 125–128.

Primary Examiner—Aristotelis Psitos
Assistant Examiner—Larry Cullen
Attorney, Agent, or Firm—Ronald P. Kananen

[57] ABSTRACT

In a motor control system, a first servo loop for a phase system and a second servo loop for a speed system are provided the pull-in operation of the motor during the transition time period is made stable, and also the operation efficiency of the low-speed CPU is not deteriorated. In the motor control system, the first servo loop is arranged by a speed detector for outputting a voltage corresponding to a frequency of a first reference signal used to set a rotational speed of the motor, a phase comparator for comparing a phase of the first reference signal with a phase of a control signal; and an adder for adding an output of the speed detector to an output of the phase comparator. The second servo block is arranged by a voltage-to-frequency converter for producing a second reference signal having a higher frequency than the frequency of the first reference signal, corresponding to a voltage signal outputted from the adder, and a phase servo block for comparing the second reference signal outputted from the voltage-to-frequency converter with a rotational speed signal of the motor, and for controlling the rotational speed of the motor based on the comparison result. Under such a circumstance, the output from the phase comparator is not applied to the adder until the motor starts its rotation and then the rotational speed thereof reaches a predetermined rotational speed.

6 Claims, 6 Drawing Sheets

MOTOR CONTROL APPARATUS USING SPEED AND PHASE CONTROL IN A FIRST LOOP AND PHASE CONTROL IN A SECOND LOOP SERIES WITH THE FIRST LOOP

BACKGROUND OF THE INVENTION

1. Field of the Invention

The present invention generally relates to a motor control system for controlling rotational speeds and phases of a motor. More specifically, the present invention is directed to a motor control system suitable to control a capstan motor and a drum motor of a magnetic recording/reproducing apparatus.

2. Description of the Related Art

Conventionally, rotational speeds and phases of motors are controlled. In particular, very precise servo controls are required for motors employed in a VTR (video tape recorder) and the like.

Figure 6:
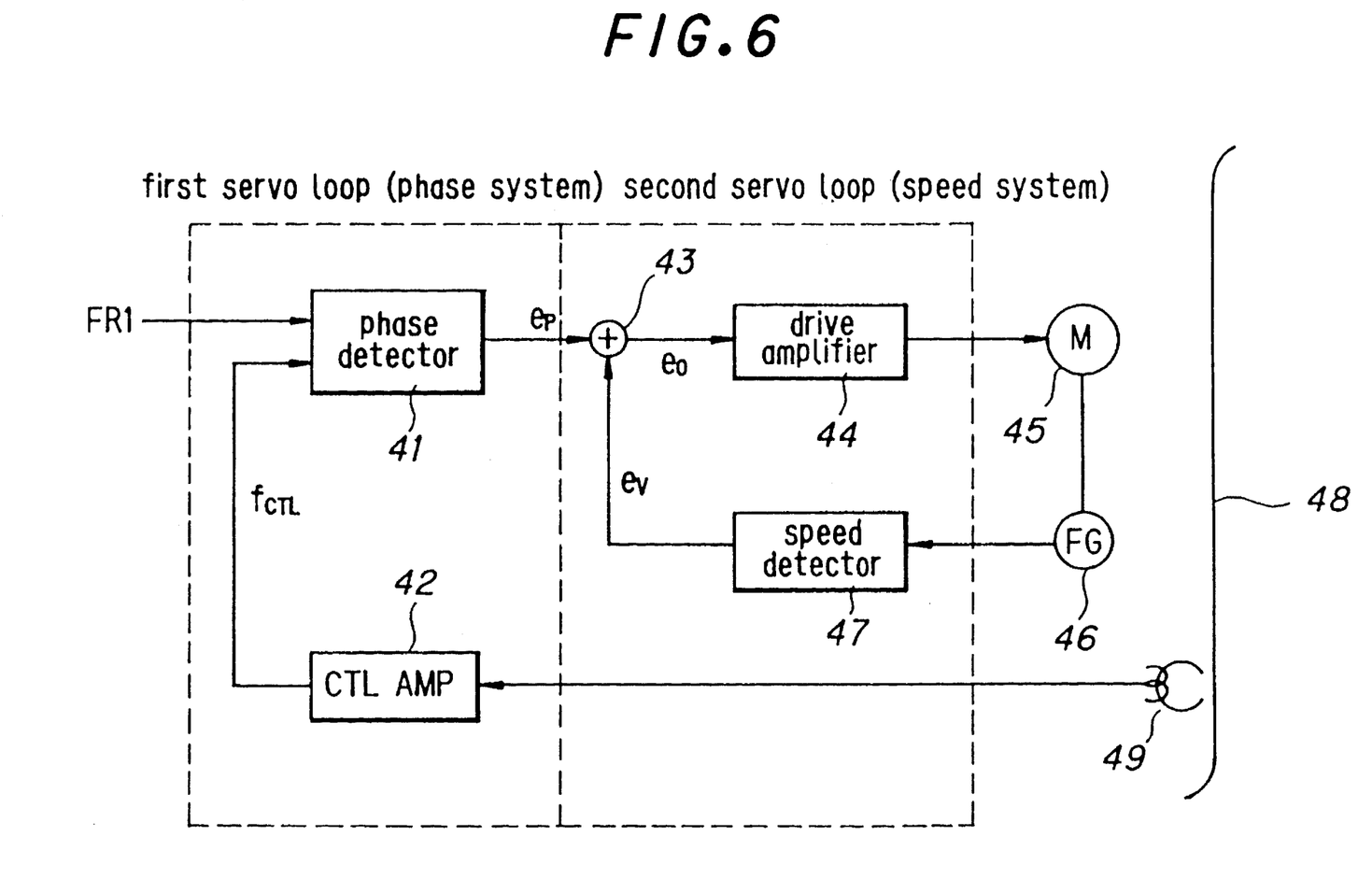
FIG. 6 is a schematic block diagram for showing the conventional motor control apparatus.

In FIG. 6, there is shown one example of such a motor control apparatus for a VTR.

In this drawing, reference numeral 41 indicates a phase detector for detecting a phase difference between a reference signal FR1 produced from the vertical sync (synchronization) signal and an output signal of a CTL amplifier 42. Reference numeral 42 refers a CTL amplifier for amplifying a control signal reproduced by a control head, reference numeral 43 is an adder for adding an output "ep" of the phase detector 41 to an output "ev" of a speed detector 47, and reference numeral 44 denotes a drive amplifier for producing a drive signal to drive a motor 45 in response to an output "eo" of the adder 43. Furthermore, reference numeral 45 is a capstan motor for rotatively driving the capstan, reference numeral 46 indicates a frequency generator (will be referred to an "FG" hereinafter) for sensing the rotational speeds of the capstan motor 45, and reference numeral 47 shows a speed detector for outputting the voltage signal "ev" in correspondence with the rotational speed of the capstan motor 45 in response to the output from the FG 46. Also, reference numeral 48 indicates a tape transported by the capstan at a predetermined speed, and reference numeral 49 denotes a control head for reproducing the control signal recorded on a control track of the tape 48.

In the motor control apparatus, the reference signal FR 1 produced from the vertical sync signal is supplied to the phase detector 41 to detect the phase difference between this reference signal FR1 and the control signal amplified in the CTL amplifier 42, and then the voltage signal "ep" responding to this phase difference is outputted.

From the output of the FG 46 for detecting the rotational speeds of the capstan motor 45, the speed detector 47 outputs the voltage signal ev in accordance with the rotational speed of the capstan motor 45.

Both the output "ep" of the phase detector 41 and the output "ev" of the speed detector 47 are supplied to the adder 43 so as to be added with each other, thereby producing the voltage signal "eo".

The voltage signal "eo" of the adder 43 is applied to the drive amplifier 44 to produce the drive signal by which the capstan motor 45 is driven and controlled.

Assuming now that the rotational speed of the motor 45 is lowered, the frequency of the output signal from the FG 46 is lowered, so that the output "ev" of the speed detector 47 is lowered. Then, since this output "ev" is inverted and added in the adder 43, the output "eo" of the adder 43 is increased, so that the capstan motor 45 is controlled by the drive amplifier 44 in such a manner that the rotational speed of the capstan motor 45 is increased. As a result, it is so controlled that the rotational speed of the capstan motor 45 becomes constant.

When the tracking is shifted, the phase of the control signal reproduced by the control head 49 is varied, and then the phase difference between the reference signal FR1 and the control signal $f_{CTL}$ becomes large. As a consequence, since the voltage signal "ep" in accordance with this phase difference is outputted from the phase detector 41, the voltage signal "eo" outputted from the adder 43 is similarly changed, and the transportation of the tape 48 by the capstan is controlled by the capstan motor 45. Therefore, the capstan is controlled by the capstan motor 45 in such a manner that the tracking of the reproducing head is continuously maintained.

In the motor control apparatus shown in FIG. 6, after the capstan motor 45 is once locked, a very stable control can be performed. However, this motor control apparatus has the following drawbacks.

That is, the adding result between the voltage signal "ep" corresponding to the phase error signal derived from the phase detector 41 and the output signal "ev" corresponding to the speed error signal derived from the speed detector 47 is fed back, and the capstan motor 45 is controlled by way of the double servo loop. The ratio of this voltage output "ep" to the output "ev" is determined by experiments, taking account of stabilities of the servo system.

However, when this adding ratio would be too small, or too large, the output "ep" would interfere with the output "ev" during the transition of the phase pull-in operation such as the rising operation of the capstan motor, resulting in unstable phase pull-in operations, or uncertain lock-in time.

When the double servo loop would be constructed of a microcomputer (referred to as "CPU") control in the motor control apparatus shown in FIG. 6, since the data process specific to the speed control system should be performed at high speeds, heavy loads would be given to this CPU for controlling the motor.

In particular, generally speaking as a CPU (microcomputer) mounted on a VTR is so arranged as to perform not only a motor control, but also a malfunction diagnosis, a system control, a measurement of servo data, and so on, a lengthy time is required to execute these process operations by the CPU. Nevertheless, most calculation processing time would be consumed only to control the motor, and thus, there is less time to process other CPU works. Accordingly, another problem may occur in that the operation efficiency of the CPU would be lowered.

To solve this problem, a high-speed CPU may be employed. However, since such a high-speed CPU has a high cost, there is another problem that the manufacturing cost of a product would be increased when such a high-speed CPU would be used.

SUMMARY OF THE INVENTION

Therefore, a primary object of the present invention is to provide a motor control system capable of performing a stable phase pull-in operation even during transition of the phase pull-in operation, and also capable of performing a high-speed access to a motor.

A secondary object of the present invention is to provide a motor control system capable of not lowering an operation efficiency of a low-speed CPU even when such a low-speed CPU would be employed to servo-control a motor. To achieve the above-described primary object, in a motor control system according to the present invention, a voltage signal corresponding to a first reference signal is outputted from a speed detector employed in a first servo loop, a second reference signal having a frequency higher than the frequency of the first reference signal is produced with use of this voltage signal, and this second reference signal is applied to the phase servo within the second servo loop, so that a rotational speed of a motor can be stably increased to a predetermined speed.

To achieve the above-explained secondary object, a motor control system according to the present invention in which a servo calculation process of a phase system corresponding to a first servo loop is performed by a CPU, whereas a servo control for a speed system corresponding to a second servo loop which requires a high-speed calculation process is arranged by the normal hardware circuit.

In accordance with the present invention, since the rotational speed of the motor can be stably increased, it is readily achieved to continuously vary a reproducing speed, as in a program play, when the motor control system of the present invention is employed in a VTR and the like.

Also, according to the present invention, even when a low-speed CPU would be employed, the operation efficiency of such a low-speed CPU would not be lowered, and various tasks could be processed by employing the CPU capable of performing the motor control.

DETAILED DESCRIPTION OF THE PREFERRED EMBODIMENTS

Figure 1:
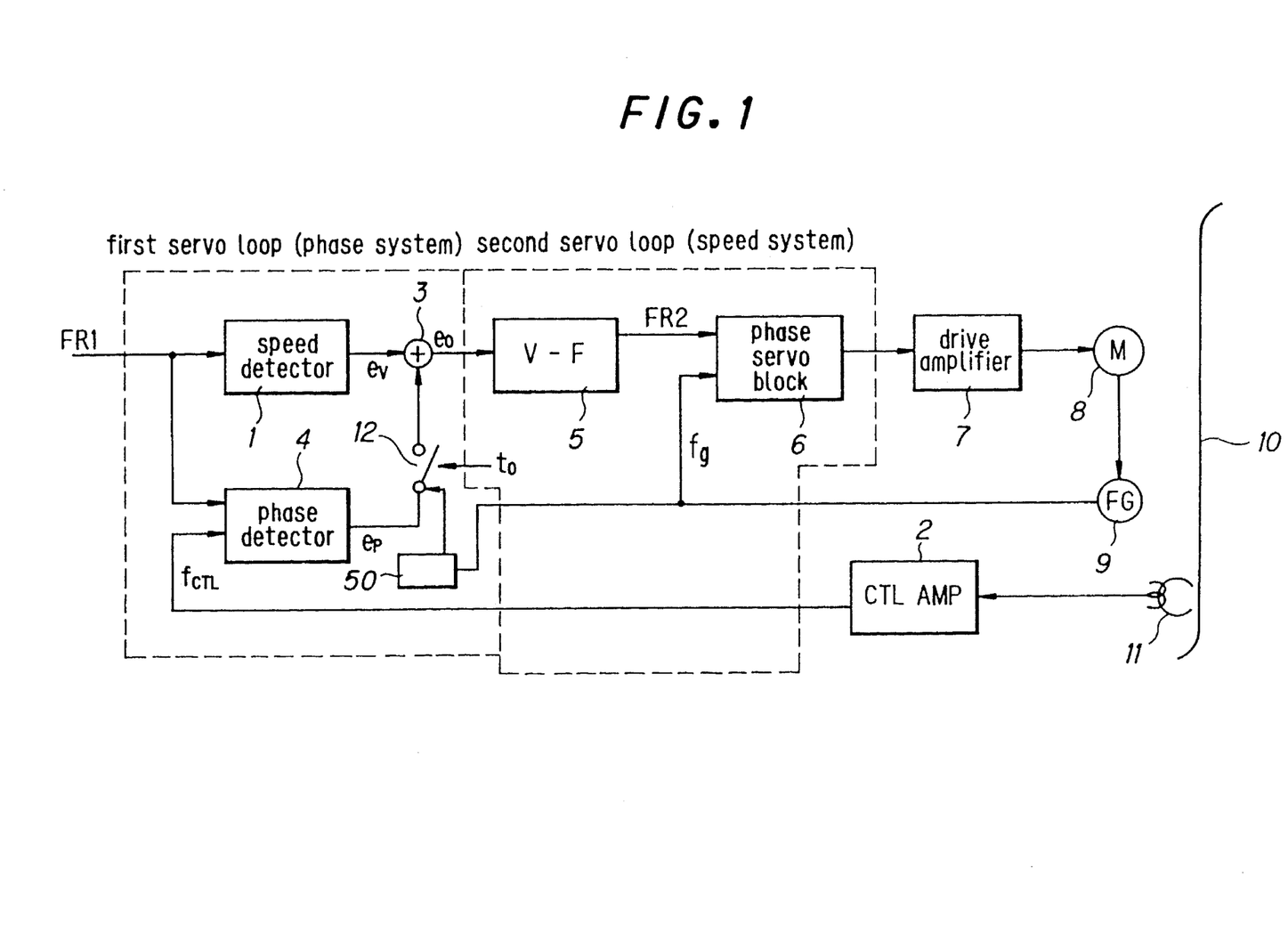
FIG. 1 is a schematic block diagram for indicating a motor control system according to a first embodiment of the present invention.

In FIG. 1, there is shown a motor control system according to a first embodiment of the present invention.

In this motor control system, reference numeral 1 shows a speed detector for outputting a voltage signal "ev" which is directly proportional to a frequency of a first reference signal FR1 produced from the vertical sync (synchronization) signal of the video signal, reference numeral 2 denotes a CTL amplifier for amplifying a control signal recorded on a magnetic tape 10, which is reproduced by a control head 11, reference numeral 3 shows an adder for adding the voltage signal "ev" outputted from the speed detector 1 to an output "ep" of a phase detector 4 outputting a phase difference signal "ep" between a phase of the first reference signal FR1 and a control signal "$f_{CTL}$". Also, reference numeral 5 is a voltage-to-frequency converter ("VF Converter") or timer for outputting a frequency signal directly proportional to an adding output "eo" of the adder 3 as a second reference signal "FR2", and reference numeral 6 represents a phase servo block for phase-locking the frequency signal of the Frequency generator FG 9 to the second reference signal FR2.

In addition, reference numeral 7 shows a drive amplifier for power-amplifying the output of the phase servo block 6 to drive a motor 8 in response to the output of the phase servo block 6, reference numeral 8 denotes a capstan motor for driving and controlling a capstan, reference numeral 9 is a frequency generator (FG) for detecting rotational speeds of the capstan motor 8, reference numeral 10 shows a recording/reproducing tape, reference numeral 11 indicates a control head for reproducing the control signal "$f_{CTL}$" from the control track of the tape 10, and reference numeral 12 indicates a switch used not to supply the output "ep" of the phase detector 4 to the adder 3 when the capstan motor 8 is started.

In this first embodiment, a first servo loop (namely, a phase system) is arranged by the speed detector 1, the phase detector 4, and the adder 3, whereas a second servo loop (namely, speed system) is arranged by the V/F converter 5 and the phase servo block 6.

In the motor control system with the above-described circuit arrangement, when the tracking operation would be shifted after the capstan motor 8 has been once locked, the phase of the control signal "$f_{CTL}$" reproduced from the control track of the tape would be accordingly shifted. Since the switch 12 is closed, this phase shift is detected by the phase detector 4 based on the phase of the reference signal FR1 as the reference phase. The detection signal "ep" of the phase detector 4 is applied to the adder 3. As a consequence, the adding output "eo" containing this phase difference output "ep" is derived from the adder 3.

Then, the frequency of the second reference signal FR2 is varied in proportion to the varied adding output "eo". In response to this variation, the phase servo block 6 will control the capstan motor 8 via the drive amplifier 7, so that transportation of the tape 10 by way of the capstan is controlled, thereby adjusting the tracking operation.

Also, if the rotational speed of the capstan motor 8 is changed, the output frequency of the frequency generator (FG) 9 will be varied. In response to this frequency variation, the phase servo block 6 controls the rotational speed of the capstan motor 8 via the drive amplifier 7 to thereby control the rotational speed of the capstan motor 8, so that the frequency signal of the FG9 is coincident with the second reference signal FR2. As a consequence, the rotational speed of the capstan motor 8 becomes constant.

Now, since the motor control system shown in FIG. 1 is characterized in operation during a rise-up period of the controlled capstan motor 8, this operation will be described more in detail.

In this first embodiment, the switch 12 is not closed during the rise-up period of the capstan motor 8, whereby the output "ep" of the phase detector 4 is not applied to the adder 3. Under this condition, the first reference signal FR2 FR1 is produced which is in correspondence with a setting rotational speed of the capstan motor 8, and then this first reference signal FR1 is supplied to the speed detector 1.

The speed detector 1 outputs the voltage signal "ev" corresponding to the frequency of the first reference signal FR1 and supplies this voltage signal "ev" to the adder 3. Since no output "ep" is applied to the adder 3, the output "eo" of the adder 3 equal to this voltage signal "ev" is applied to the V/F converter 5. The V/F converter 5 produces the second reference signal having the high frequency which is directly proportional to the voltage signal "ev" corresponding to the output from the adder 3. It should be noted that this frequency is, for instance, ten times higher than that of the first reference signal FR1.

This second reference signal FR2 is supplied to the phase servo block 6 so as to be phase-compared with the frequency signal "fg" outputted from the FG 9. As a result, the phase servo block 6 controls the rotational speed of the capstan motor 8 via the drive amplifier 7 in such a manner that the phase of this frequency signal "$f_g$" is coincident with that of the second reference signal FR2.

In accordance with the above-described operation, since the second reference signal having such a high frequency is directly proportional to the frequency of the first reference signal FR1 during the rise-up period of the capstan motor 8, quick responding characteristics of the second servo loop can be achieved. As a consequence, the rotational speed of the capstan motor 8 can be stably increased at a high speed.

When the rotational speed of the capstan motor 8 rises substantially up to the rotational speed to be set, the switch 12 is closed in response to a drive signal "to" (which will be discussed). Then, the phase detection output "ep" of the phase detector 4 is supplied to the adder 3. Since the capstan motor 8 is controlled based on the phase difference between the control signal "$f_{CTL}$" and the first reference signal FR1, the capstan motor 8 is controlled in order to establish the correct tracking operation.

It should be noted that the timing "to" to drive the switch 12 may be produced by employing, for instance, a presettable timing based on either inertia or a torque characteristic of the capstan motor 8. Otherwise, the switch 12 is closed under control of a controller 50 when a detection is made that the output frequency of the FG 9 monitored by the controller 50 becomes substantially equal to the setting rotational speed.

To perform such an operation in the motor control system shown in FIG. 1, the frequency of the first reference signal FR1 is sequentially changed based on the program, so that the programmed plays such as a slow-speed reproduction or a twice-speed reproduction may be continuously executed.

Figure 2:
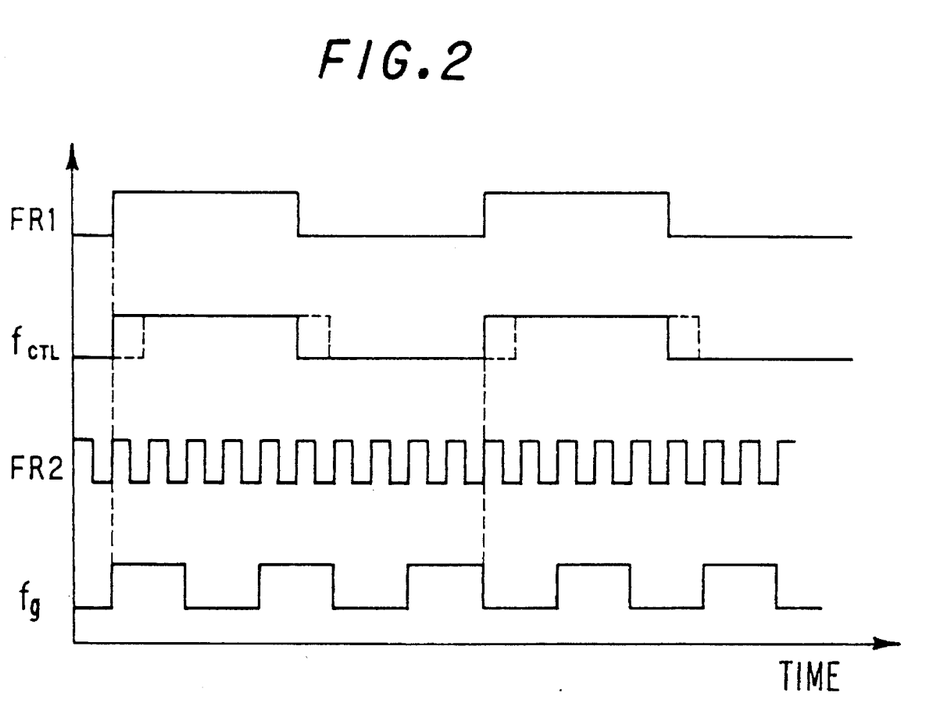
FIG. 2 is a waveform for showing operations of the motor control system of FIG. 1.

FIG. 2 represents a pulse waveform for explaining the above-explained operations of the motor control system. The pulse timing shown in FIG. 2 shows such a case that the rotational speed and the phase of the capstan motor 8 are locked to the first reference signal FR1.

While those of the capstan motor 8 are locked to the first reference signal FR1, both the first reference signal FR1 and the control signal $f_{CTL}$ are supplied to the phase detector 4, from which the output signal "ep" is derived in order that the phase of the first reference signal FR1 is coincident with that of the control signal $f_{CTL}$. In this case, as shown in FIG. 2, since the phases of both the signals are coincident with each other, no rotational error signal for controlling the capstan motor 8 is outputted.

It should also be noted that as indicated in this drawing, the frequency of the second reference signal FR2 is selected to be 10 times higher than that of the first reference signal FR1, and the frequency of the frequency signal "fg" outputted from the FG 9 becomes ¼ of the frequency of the second reference signal FR2.

Then, when the tracking condition is shifted, the phase of the control signal $f_{CTL}$ is positionally shifted with respect to the phase of the first reference signal FR1, as indicated by a dotted line. Furthermore, when the rotational speed of the capstan motor 8 is shifted, the frequency of the frequency signal fg outputted from the FG9 is shifted with regard to the frequency of the second reference signal (not shown).

These shifts are detected by either the phase detector 4, or the phase servo block 6, and then the capstan motor 8 is controlled in such a manner that, as previously explained, the shifted phase or the shifted frequency is coincident with that of either the first reference signal FR1, or the second reference signal FR2.

Figure 3:
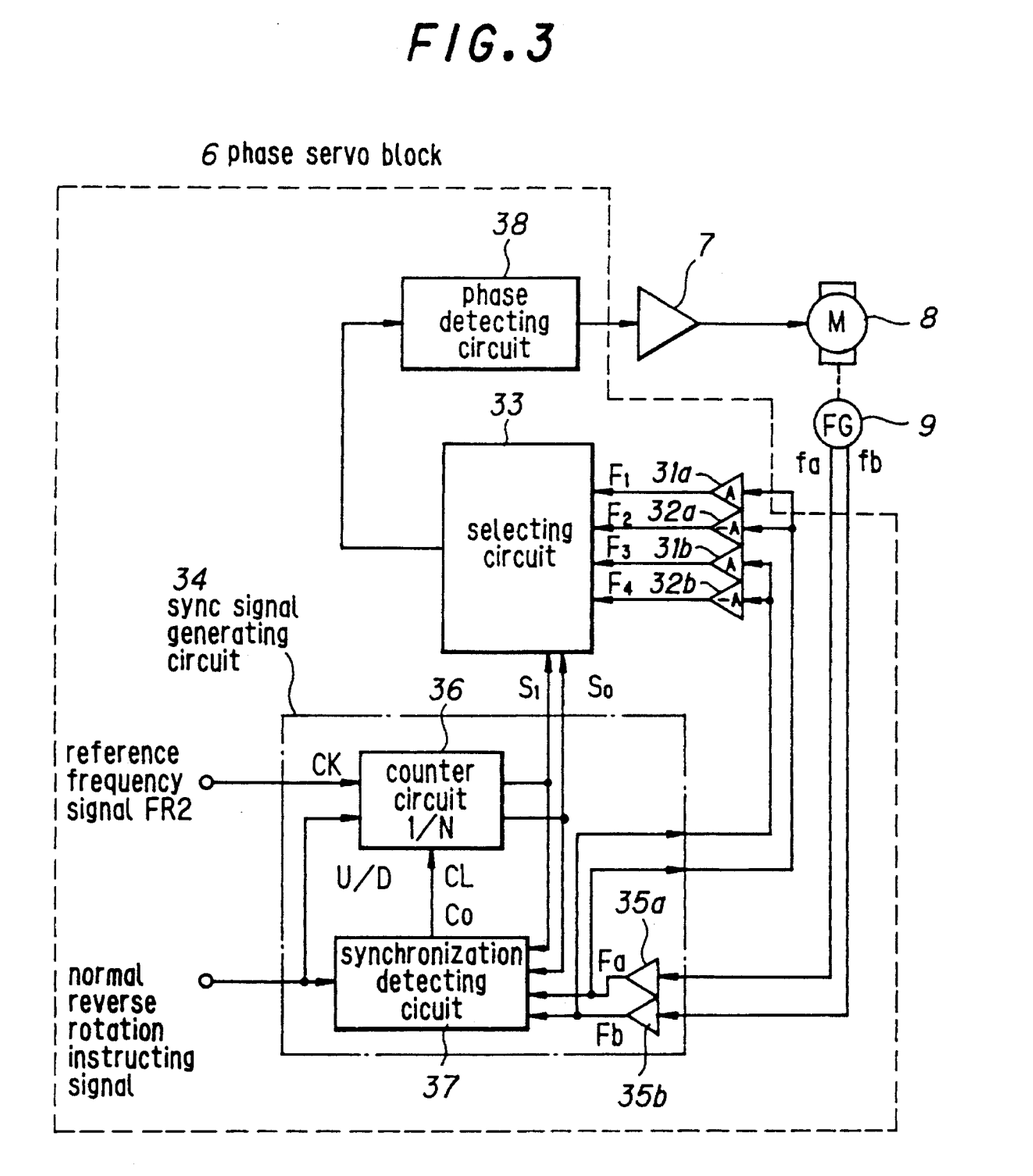
FIG. 3 is a schematic block diagram for representing a phase servo block of the motor control system shown in FIG. 1.
Figure 4:
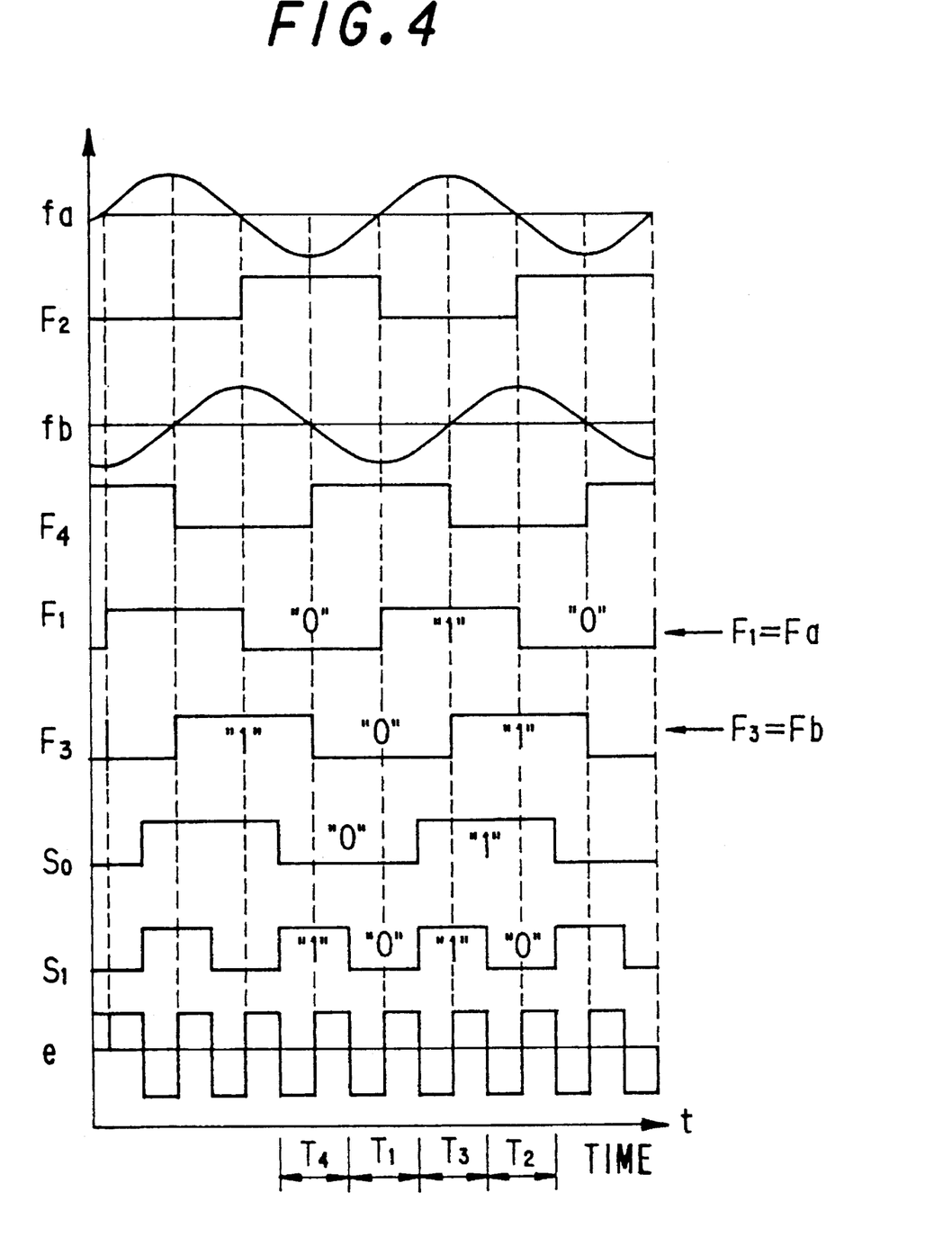
FIG. 4 is a waveform for representing operations of the phase servo block shown in FIG. 3.

Next, an example of a circuit arrangement of the above-explained phase servo block 6 is shown in FIG. 3, and a waveform chart of operations thereof is represented in FIG. 4.

Since the phase servo block 6 indicated in FIG. 3 has been filed as prior Japanese patent application number JP-92120006, only an outline thereof will now be described.

As represented in FIG. 3, two-phase signals "fa" and "fb" outputted from the FG 9 are supplied to pulse shaping circuits 35a and 35b constructed of comparators. A shaped output "Fa" is supplied to a non-inverting amplifier 31a and also to an inverting amplifier 32a, whereas another shaped output "Fb" is supplied to a non-inverting amplifier 31b and an inverting amplifier 32b. Output signals derived from these amplifiers are assumed as signals $F_1$, $F_2$, $F_3$, and $F_4$ whose phases are different from each other by 90 degrees, which will then be inputted to a selecting circuit 33.

In the selecting circuit 33, one of these 4-phase signals $F_1$ to $F_4$ is selected, depending on conditions of synchronization (sync) signals ($S_0$, $S_1$) outputted from a sync signal generating circuit 34. That is, the signal $F_4$ is selected for a time period "$T_4$" during which the conditions of the sync signals ($S_0$, $S_1$) are (0,1). The signal $F_1$ is selected for a time period "$T_1$" during which the conditions of the sync signals ($S_0$, $S_1$) are (0,0), the signal $F_2$ is selected for a time period "$T_2$" during which the sync signals ($S_0$, $S_1$) are (1,0), and the signal $F_3$ is selected for a time period "$T_3$" during which the sync signals ($S_0$, $S_1$) are (0,1). These signal selections are repeatedly performed so that a pulse signal "e" having a time period which is ¼ shorter than that of the signal $F_1$ is obtained.

The pulse signal "e" corresponds to a phase error voltage signal between the second reference signal FR2 and either the signal fa, or the signal fb outputted from the FG 9. This phase error voltage signal "e" is detected by the phase detecting circuit 38 and then the detected phase error voltage signal is applied to the drive amplifier 7, so that this closed loop controls so that the rotational speed of the capstan motor 8 becomes the rotational speed corresponding to the second reference signal FR2.

The second reference signal FR2 is supplied to a 1/N counter circuit 36 so as to be frequency-divided in such a way that the divided frequency of the second reference signal FR2 is coincident with the frequency of the frequency signal fg outputted from the FG 9. Also, the frequency-divided signals $S_0$ and $S_1$ are applied to a synchronization detecting circuit 37 for comparing these frequency-divided signals $S_0$, $S_1$ with the signals Fa, Fb outputted from the FG 9 to produce an output signal "$C_0$". Based on this output signal $C_0$, an input CL of the counter circuit 36 is controlled.

Figure 5:
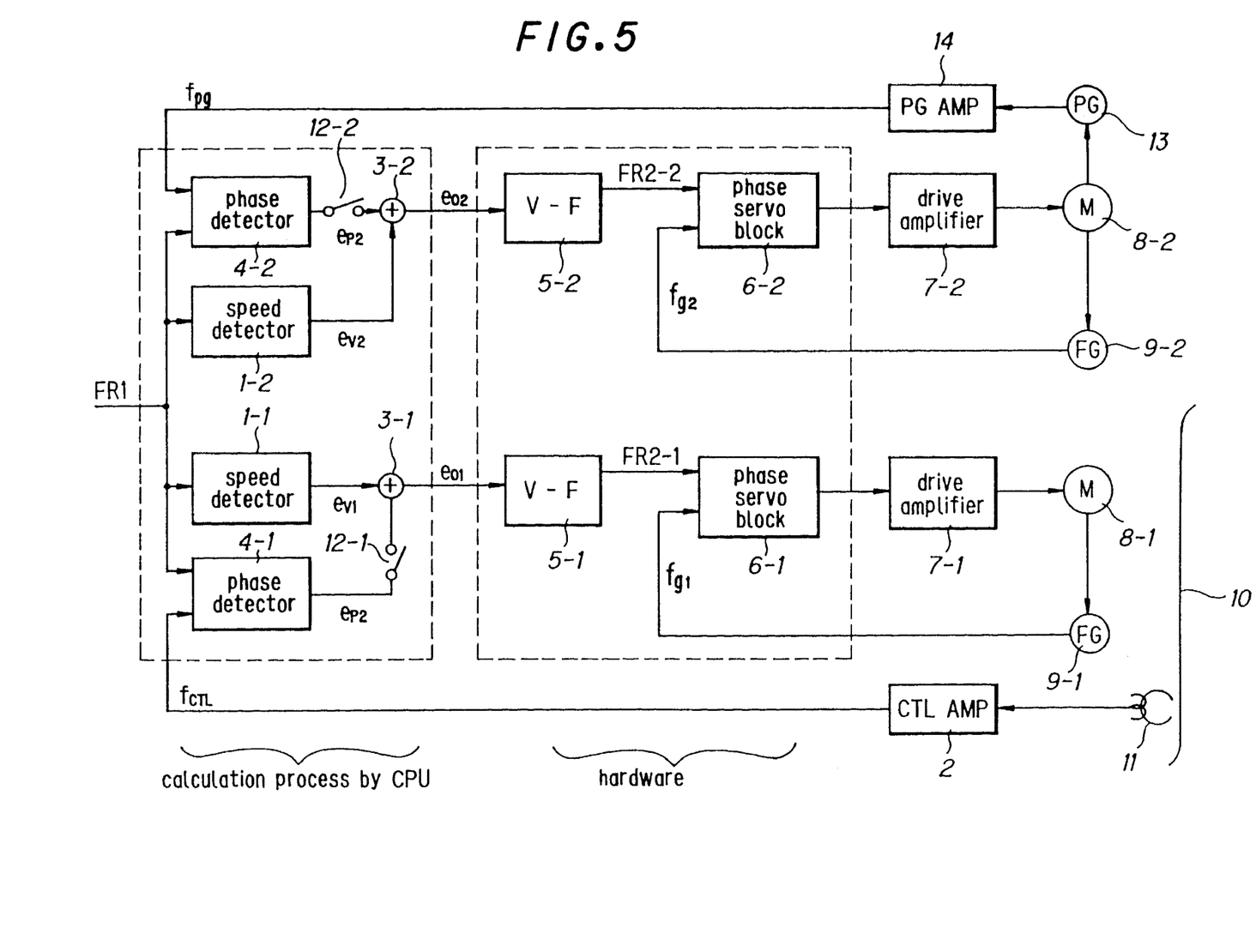
FIG. 5 is a schematic block diagram for indicating a motor control system according to another embodiment of the present invention.

Also, a plurality of motors may be controlled based upon the first reference signal FR1, which is realized by another embodiment as shown in FIG. 5.

In this drawing, reference numerals 1-1 and 1-2 represent speed detectors for outputting voltage signals ev1 and ev2 which are directly proportional to the frequency of the first reference signal FR1 produced from the vertical sync signal of the video signal, reference numeral 2 denotes a CTL amplifier for amplifying a control signal reproduced by a control head 11, from a tape 10 and reference numerals 3-1 and 3-2 show adders for adding the voltage signal "ev1" of the speed detector 1-1 to an output "ep1" of the phase detector 4-1, or for adding the voltage signal "ev2" of the speed detector 1-2 to an output "ep2" of the phase detector 4-2. Also, reference numeral 4-1 indicates a phase detector for outputting the phase difference output "ep1" between the phase of the first reference signal FR1 and that of the control signal "$f_{CTL}$", and reference numeral 4-2 denotes a phase detector for outputting the phase difference output "ep2" between the phase of the first reference signal FR1 and that of a pulse signal $f_{pg}$ indicative of a rotational phase of a rotary drum, produced from a pulse generator 13.

Furthermore, reference numerals 5-1 and 5-2 show V/F converters for outputting an added output "e0" of the adder 3-1 or the adder 3-2, or an output of a second reference signal FR2-2 or FR2-1 whose frequency is directly proportional to the outputs from the adder 3-2 and adder 3-1, respectively $e0_2$. Reference numerals 6-1 and 6-2 indicate phase servo locks for phase-locking a frequency signal of an FG 9-1 to the second reference signal FR2-1, or a frequency signal of an FG 9-2 to the reference signal FR2-2. Also, reference numerals 7-1 and 7-2 denote drive amplifiers for power-amplifying the outputs from the phase servo blocks 6-1, 6-2, to drive capstan motor 8-1 or a drum motor 8-2 in response to the outputs of the phase servo blocks 6-1 and 6-2, and reference numeral 8-1 is a capstan motor for rotatively driving a capstan, reference numeral 8-2 is a drum motor for rotatively driving the rotary drum.

Also, reference numerals 9-1 and 9-2 represent frequency generators (FG) for detecting a rotational speed of either the capstan motor 8-1, or the drum motor 8-2, reference numeral 10 indicates a recording/reproducing tape, reference numeral 11 shows a control head for reproducing a control signal from a control track of the tape 10, reference numerals 12-1 and 12-2 are switches for not applying the outputs "$ep_1$" and "$ep_2$" of the phase detectors 4-1 and 4-2 to the adders 3-1 and 3-2 when the rotational speeds of the capstan motor 8-1 and the drum motor 8-2 are increased, reference numeral 13 is a pulse generator (PG) for generating a pulse indicative of a rotary phase of the drum motor, and reference numeral 14 shows a PG amplifier for amplifying the pulse signal derived from the pulse generator 13.

It should be understood that a first servo loop (namely, a phase system) is arranged by either the speed detector 1-1, the phase detector 4-1 and the adder 3-1, or the speed detector 1-2, the phase detector 4-2, and the adder 3-2, whereas a second servo loop (namely, a speed system) is arranged by either the V/F converter 5-1, and the phase servo block 6-1, or the V/F converter 5-2 and the phase servo block 6-2.

Since the control operation of the capstan motor 8-1 in the motor control system of FIG. 5 is similar to that of FIG. 1, no detailed explanation thereof is made in the following description. The drum motor 8-2 is controlled as follows:

When the rotational speed of the drum motor 8-2 is increased from 0, the switch 12-2 is not closed, and only the output "$ev_2$" of the speed detector 1-2, which outputs the voltage signal being directly proportional to the frequency of the first reference signal FR1, is supplied to the adder 3-2. The output "$e0_2$" of the adder 3-2 is equal to the voltage signal "ev2" which is applied to the V/F converter 5-2.

The V/F converter 5-2 produces the second reference signal FR2-2 having the higher frequency than that of the first reference signal FR1 which is directly proportional to the output "$e0_2$" applied to the V/F converter 5-2, and then supplies this second reference signal FR2-2 to the phase servo lock 6-2. To this phase servo lock 6-2, the frequency signal "$fg_2$" of the FG 9-2 is supplied which is produced in accordance with the rotational speed of the drum motor 8-2. The phase servo lock 6-2 controls the rotational speed of the drum motor 8-2 via the drive amplifier 7-2 in such a manner that this frequency signal $fg_2$ becomes equal to the frequency of the second reference signal FR2-2.

As previously explained, since the frequency of the second reference signal FR2-2 is higher than that of the first reference signal FR1, the rotational speed of the drum motor 8-2 is pulled into the rotational speed preset by the first reference signal at a high speed.

Thereafter, when the switch 12-2 is closed, the phase difference between the rotational phase signal "$f_{pg}$" of the drum motor 8-2 and the first reference signal FR1 is detected by the phase detector 4-2 to obtain the phase difference signal "$ep_2$". Based upon this phase difference signal "$ep_2$", the drum motor 8-2 is controlled so that the phase of the rotational phase signal "$f_{pg}$" is coincident with that of the first reference signal FR1.

Referring now to FIG. 5, the motor control system according to the second embodiment of the present invention will now be described.

Consider now that the servo control is performed by employing a CPU (central processing unit) in the motor control system of FIG. 5.

Assuming now that the frequency of the first reference signal FR1 is selected to be 50 Hz and the frequency of the frequency signal fg of the FG 9 is selected to be 1 KHz, when the motor control system is operated under such a condition, a sampling time $T_{s1}$ of the first servo loop is given as follows:

$$T_{S1} = 1/50 = 20 \text{ mS}$$

A sampling time $T_{S2}$ of the second servo loop is given as follows:

$$T_{S2} = 1/1000 = 1 \text{ mS}$$

Assuming also that the operation efficiency of the CPU is "$\eta_1$" in case of the first servo loop, and the operation efficiency of the CPU is "$\eta_2$" in case of the second servo loop, the operation efficiency "$\eta$" of the CPU when the calculation time $T_0$ of the CPU is performed at the same time as 0.5 mS together with the first and second servo loops is expressed as follows:

$$\eta_1 = (1 - T_0/T_{S1}) \times 100 = 98\%$$

$$\eta_2 = (1 - T_0/T_{S2}) \times 100 = 50\%.$$

In other words, the operation efficiency is deteriorated only by 2% during the process operation of the first servo loop, whereas the operation efficiency is deteriorated by 50% during the process operation of the second servo loop. As a result, it is not possible to perform the servo control to a plurality of motors by employing a single CPU in accordance with the same algorithm.

However, if an attention is paid only for the phase system corresponding to the first servo loop, even when 10 motors are controlled in accordance with the same algorithm, the operation efficiency of the CPU would be deteriorated only by 20%. On the other hand, the speed system corresponding to the second servo loop for constituting a feed back loop by the second reference signal FR2 and the frequency signal fg from the FG 9, requires high-speed processing operation, but does not require the complex judgement function.

Then, in accordance with the motor control system of the second embodiment of the present invention, the calculation process of the first servo loop is executed by employing the CPU, whereas the second servo loop is constructed by utilizing hardware such as a gate array, and a digital signal processor (DSP), so that a plurality of motors can be servo-controlled without lowering the operation efficiency of the CPU.

That is, as shown in FIG. 5, the process operation of the first servo loop is performed by employing the CPU (not shown in detail), which corresponds to the phase system arranged by either the speed detector 1-1, the phase detector 4-1, and the adder 3-1, or the speed detector 1-2, the phase detector 4-2, and the adder 3-2, whereas the second servo loop corresponding to the speed system is arranged by, for example, a hardware.

As a consequence, even when the low-speed CPU is employed, not only the motor servo control operation is carried out, but also various process operations such as malfunction diagnosises, system controls, and measurements of servo data may be performed at the same time.

It should be noted that similar effects achieved by the motor control system of the second embodiment as shown in FIG. 5 may be realized even when the first servo loop in the motor control system of the first embodiment shown in FIG. 1 would be arranged by employing the CPU, and also the second servo loop thereof would be constructed of hardware, and moreover even when the first servo loop in the motor control system indicated in FIG. 6 would be arranged by employing the CPU, and the second servo loop thereof would be constructed of hardware.

As previously described, since the present invention is constructed in the above-described manner, and the rotational speed of the motor may be quickly increased from 0, the reproducing speed can be continuously varied such as in the programmed plays when the motor control system of the present invention is applied to the VTR and the like.

Furthermore, even when a low-speed CPU is utilized in the motor control system according to the present invention, since the operation efficiency of the low-speed CPU is increased, various tasks can be processed by the low-speed CPU.

What is claimed is:

1. An apparatus for controlling a motor, comprising:
    a first servo loop for controlling a rotational phase of said motor and a second servo loop for controlling a speed of said motor wherein a first control signal output from said first servo loop is input to said second servo loop and said motor is controlled based upon a second control signal output from said second servo loop;
    wherein said first servo loop comprises:
        speed detecting means for outputting a voltage corresponding to a frequency of a first reference signal for setting the rotational speed of the motor;
        phase comparing means for comparing a phase of said first reference signal with a phase of a control signal generated by a control head; and
        adding means for adding an output of said speed detecting means to an output of said phase comparing means, an output signal of said adding means being said first control signal; and
    wherein said second servo loop comprises:
        a voltage-to-frequency converter for producing a second reference signal having a frequency higher than the frequency of said first reference signal; and
        a phase servo block for comparing said second reference signal with a speed signal representative of the rotational speed of said motor to control the rotational speed of the motor, an output signal of said phase servo block being said second control signal.

2. A motor controlling apparatus according to claim 1, further comprising means for preventing the output signal of said phase comparing means from being applied to said adding means until said motor starts its rotation and the rotational speed thereof reaches a predetermined rotational speed.

3. A motor controlling apparatus according to claim 1, wherein said motor comprises a capstan motor of a tape recorder.

4. A motor controlling apparatus according to claim 1, wherein said motor comprises a drum motor.

5. A motor controlling apparatus comprising:
    a first servo loop comprising:
        a speed detector for outputting a voltage corresponding to a frequency of a first reference signal used to set a rotational speed of a motor;
        a phase comparator for comparing a phase of said first reference signal with a phase of a control signal generated by a control head; and
        an adder for adding an output of said speed detector to an output of said phase comparator;
    a second servo loop comprising:
        a voltage-to-frequency converter for receiving an output from said adder and for producing a second reference signal having a frequency higher than a frequency of said first reference signal; and
        a phase servo block for comparing said second reference signal outputted from said voltage-to-frequency converter with a rotational speed signal of said motor;
        means for controlling the rotational speed of said motor based on an output from said phase servo block;
    wherein said first servo loop further comprises means for preventing said output from the phase comparator from being applied to said adder until said motor starts its rotation and the rotational speed thereof reaches a predetermined rotational speed.

6. A motor controlling apparatus according to claim 5, wherein said preventing means comprises a controller and a switch, said controller controlling said switch so that said output of said phase comparator is provided to said adder when said rotational speed reaches said predetermined rotational speed.

* * * * *